(12) United States Patent
Currier et al.

(10) Patent No.: US 10,856,400 B2
(45) Date of Patent: Dec. 1, 2020

(54) CONNECTING PLASMA ARC TORCHES AND RELATED SYSTEMS AND METHODS

(71) Applicant: Hypertherm, Inc., Hanover, NH (US)

(72) Inventors: Brian J. Currier, Newport, NH (US); Jeremy Beliveau, Cornish, NH (US); Stephen M. Liebold, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 218 days.

(21) Appl. No.: 15/913,022

(22) Filed: Mar. 6, 2018

(65) Prior Publication Data
US 2018/0263102 A1 Sep. 13, 2018

Related U.S. Application Data

(60) Provisional application No. 62/468,172, filed on Mar. 7, 2017.

(51) Int. Cl.
| | |
|---|---|
| *B23K 10/00* | (2006.01) |
| *H05H 1/28* | (2006.01) |
| *B23K 9/32* | (2006.01) |
| *H05H 1/34* | (2006.01) |

(52) U.S. Cl.
CPC ............. *H05H 1/28* (2013.01); *B23K 9/323* (2013.01); *H05H 1/34* (2013.01)

(58) Field of Classification Search
CPC ... H05H 1/26; H05H 1/28; H05H 1/34; B23K 9/323; B23K 9/285
USPC ........ 219/121.49, 121.5, 121.51, 121.52, 75, 219/121.48
See application file for complete search history.

(56) References Cited

U.S. PATENT DOCUMENTS

| | | | | |
|---|---|---|---|---|
| 5,074,802 A | | 12/1991 | Gratziani et al. | |
| 5,247,152 A | * | 9/1993 | Blankenship | ............ H05H 1/28 219/121.48 |
| 5,328,516 A | * | 7/1994 | Dietiker | .................. H05H 1/28 118/715 |
| 5,624,586 A | * | 4/1997 | Sobr | ........................ H05H 1/34 219/121.48 |
| 6,683,273 B2 | | 1/2004 | Conway et al. | |
| 6,713,711 B2 | | 3/2004 | Conway et al. | |
| (Continued) | | | | |

FOREIGN PATENT DOCUMENTS

| | | |
|---|---|---|
| FR | 2949698 A1 | 3/2011 |
| FR | 2949938 A1 | 3/2011 |
| JP | H01118374 A | 5/1989 |

*Primary Examiner* — Mark H Paschall
(74) *Attorney, Agent, or Firm* — Proskauer Rose LLP (57) ABSTRACT

In some aspects, a plasma torch head for a plasma arc torch can include ports disposed within a base portion that are configured to receive fluids and electrical signals from a plasma torch lead via a plasma torch receptacle, the ports being shaped to align the torch head and the plasma torch receptacle during connection and including: a central coolant supply port to convey a liquid coolant to the torch head, the central coolant supply port extending a length to primarily align the plasma torch head with the torch receptacle, the central coolant supply port further including a flat surface shaped to secondarily align the torch head with the torch receptacle upon mating engagement, and an ohmic contact connector defining a tertiary alignment feature; and a connector disposed about the base portion shaped to engage with and couple to the torch receptacle.

21 Claims, 5 Drawing Sheets

(56) References Cited

U.S. PATENT DOCUMENTS

| | | | |
|---|---|---|---|
| 7,375,301 B1 * | 5/2008 | Noujaim | H05H 1/34 |
| | | | 219/121.47 |
| 8,766,134 B2 | 7/2014 | Mather et al. | |
| 9,781,818 B2 * | 10/2017 | Twarog | H05H 1/3405 |
| 10,278,274 B2 * | 4/2019 | Sanders | H05H 1/36 |
| 10,576,575 B2 * | 3/2020 | Jogdand | H05H 1/34 |
| 2008/0251503 A1 | 10/2008 | Noujaim | |
| 2011/0198320 A1 | 8/2011 | Mather et al. | |

* cited by examiner

CONNECTING PLASMA ARC TORCHES AND RELATED SYSTEMS AND METHODS

RELATED APPLICATIONS

This application claims the benefit of U.S. Provisional Patent Application Ser. No. 62/468,172 filed Mar. 7, 2017, entitled "Plasma Torch Head Quick Disconnect," the contents of which are hereby incorporated herein by reference in their entirety.

TECHNICAL FIELD

This disclosure relates generally to plasma arc torches, and more specifically to connecting plasma arc torches to torch leads and power supplies and to related systems and methods.

BACKGROUND

Some conventional torch systems (e.g., plasma arc torch systems) include one or more electrical and gas delivery lead lines having torch lead connectors to transfer electrical current, seal liquid/gas connections, and/or provide a securing method between a torch and a power supply. Traditionally, a torch receptacle is located at a distal end of the lead opposite the power supply, the torch receptacle for connecting the torch to the lead and including a set of discrete connections for each of gas, coolant, etc., which are connected one at a time, each one being screwed and/or fastened together independently. Some conventional torch receptacles utilize distinct threaded connectors to achieve these connections. In some cases, some plasma torch power supplies have multiple distinct threaded connections to fluidly and electrically connect a torch to the power supply via a lead and torch receptacle. Having a set of discrete connections such as this makes installation and maintenance difficult and time consuming, requiring an experienced and knowledgeable technician to even disconnect or reconnect the torch lead to the system.

SUMMARY

In some aspects, plasma torch heads for liquid-cooled plasma cutting systems can include: a base portion; a set of ports disposed within the base portion and configured to receive fluids and/or electrical signals from a plasma torch lead via a plasma torch receptacle, the set of ports being shaped to align the torch head and the plasma torch receptacle during connection, the set of ports including: a central coolant supply port defining a passage to convey a liquid coolant to the plasma torch head, the central coolant supply port extending a first length from the base portion to primarily align the plasma torch head with the torch receptacle, the central coolant supply port further including a flat surface shaped to secondarily align the torch head with the torch receptacle upon mating engagement, at least one plasma processing gas supply port to convey a plasma processing gas to the plasma torch head, and an ohmic contact connector defining a tertiary alignment feature; and a connector disposed about the base portion shaped to matingly engage the torch receptacle to couple the torch head to the torch receptacle.

Embodiments can include one or more of the following features.

The coolant supply port can be further configured to conduct power from the torch receptacle to the torch head.

In some embodiments, of the set of ports, a coolant return port is disposed at about 0 degrees, the ohmic contact connector is disposed at about 45 degrees, a shield gas port is disposed at about 80 degrees, a first processing gas supply port is disposed at about 180 degrees, and a pilot arc connector is disposed at about 315 degrees, respectively, relative to a central axis of the base portion. In some embodiments, the connector includes a multi-start thread formed on an interior surface, the multi-start thread being configured to matingly engage a complementary multi-stub thread on an exterior surface of the torch receptacle. The flat surface is defined along an outer surface of a cylindrical portion of the coolant supply port and is substantially parallel to a longitudinal axis of the coolant supply port. In some cases, the flat surface faces about 45 degrees away from a coolant return port relative to a central axis of the base portion. The ohmic contact connector can extend from the base portion to a second length that is greater than the first length, where the second length of the ohmic contact connector is greater than lengths of other ports. The second length of the ohmic contact connector can be at least about 0.125 inches greater than lengths of the other ports.

In some embodiments, the connector is shaped to matingly engage the torch receptacle prior to operable connection of each of the ohmic contact connector, the coolant supply port, and the at least one plasma processing gas supply port. The primary alignment can include a coarse radial alignment. The secondary alignment can include a coarse clocking alignment. The tertiary alignment can include a fine clocking alignment. The central coolant supply port can further define an outer surface at a proximal region of the central coolant supply port that is configured to finely radially align the plasma torch head with the torch receptacle. The plasma torch head can include a second gas supply port disposed between the first gas supply port and the coolant return port. The second gas supply port can include a shield gas supply port. The plasma torch head can further include a coolant return port to convey a return flow of liquid coolant from the plasma arc torch to the liquid-cooled plasma cutting system connected. The plasma torch head can further include a pilot arc contact, wherein the pilot arc contact and the ohmic contact are located adjacent to a coolant return port.

In some aspects, methods of aligning and coupling a plasma torch head for a liquid-cooled plasma cutting system to a torch receptacle of a plasma torch lead can include: providing a plasma torch head comprising a base portion defining a set of ports configured to receive fluids and/or electrical signals from a plasma torch lead via a plasma torch receptacle, the set of ports being shaped to align the torch head and the plasma torch receptacle during connection; inserting a central coolant supply port of the set of ports into a central coolant opening of the torch receptacle, the central coolant supply port defining a passage to convey: i) a liquid coolant to the plasma torch head, and ii) electrical power for plasma generation to the torch head, the central coolant supply port extending a first length from the base portion to coarsely radially align the plasma torch head with the torch receptacle; rotating the plasma torch head relative to the torch receptacle to align a flat surface of the central coolant supply port with a complementary feature of the torch receptacle to coarsely rotationally align the plasma torch head with the torch receptacle; further inserting the plasma torch head into the torch receptacle; finely rotating the plasma torch head relative to the torch receptacle to align an ohmic contact connector, of the set of ports, extending from the base portion with an opening within the torch receptacle to finely rotationally align the torch head with the torch receptacle to align other ports of the set of ports with complementary ports of the torch receptacle; further inserting the torch head into the torch receptacle to bring a torch connector, disposed about the base portion of the torch head, into contact with the torch receptacle; and engaging the torch connector to couple the torch head to the torch receptacle to establish connections between the set of ports of the torch head with complementary ports of the torch receptacle.

Embodiments can include one or more of the following features.

The rotating the plasma torch head relative to the torch receptacle to align the flat surface of the central coolant supply port with the complementary feature of the torch receptacle can be performed after the inserting of the central coolant supply port of the set of ports into the central coolant opening of the torch receptacle and before the rotating the plasma torch head relative to the torch receptacle to align the pin connector extending from the base portion with the opening within the torch receptacle. The engaging the torch connector to couple the torch head to the torch receptacle can include rotating a multi-start threaded connector about the base portion.

In some aspects, plasma torch heads for a liquid-cooled plasma cutting system can include: a base portion; a set of ports disposed within the base portion and configured to receive fluids and/or electrical signals from a plasma torch lead via a plasma torch receptacle, the set of ports being shaped to align the torch head and the plasma torch receptacle during connection, the set of ports including: a central coolant supply port defining a passage to convey a liquid coolant to the plasma torch head, the central coolant supply port extending a first length from the base portion to primarily align the plasma torch head with the torch receptacle, the central coolant supply port further comprising a flat surface shaped to secondarily align the torch head with the torch receptacle upon mating engagement; a coolant return port is disposed at 0 degrees relative to a central axis of the base portion; an ohmic contact connector extending from the base portion to a second length that is greater than the first length, the ohmic contact connector defining a tertiary alignment feature, the ohmic contact connector being disposed at about 45 degrees relative to the central axis of the base portion; a shield gas port is disposed at about 80 degrees relative to the central axis of the base portion; a first processing gas supply port to convey a plasma processing gas to the plasma torch head, the first processing gas supply port being disposed at about 180 degrees relative to the central axis of the base portion; and a pilot arc connector is disposed at about 315 degrees relative to the central axis of the base portion; and a multi-start threaded connector disposed about the base portion and being configured to couple the torch head to the torch receptacle.

Embodiments described herein can have one or more of the following advantages.

Plasma arc cutting systems can include torches that must be periodically disconnected and/or replaced for maintenance and operation related purposes. Removing the torch head allows for consumable changes and torch care to be accomplished in a cleaner environment, which can result in better performance and reliability. Removal and installation of such torch heads can be a complicated process that requires the individual disconnection and reattachment of multiple hoses, leads, and passageways. Some conventional plasma torch platforms having removable torch heads attempt to address the complicated attachment processes to allow for quick consumable changes, resulting in less downtime. However, such conventional plasma torch platforms with removable torch heads can typically still require longer times to install or remove the torch head from the torch receptacle due to inconvenient or difficult component alignment techniques.

Whereas, the systems and methods described herein can provide one or more advantages over some of the conventional devices. For example, the systems and methods described herein can include systems and features for both coarse and fine radial alignment of components, as well as coarse and fine rotational alignment (e.g., circumferential, angular orientation, or clocking alignment) of components that can make the torch faster and easier to fully align with a torch lead/torch receptacle. The torch systems can also include connectors having multiple start threads to provide for faster and easier engagement. The improved quick disconnect systems described herein can involve several stages of alignment prior to engaging the mechanical coupling feature itself. In some embodiments, mechanical coupling is achieved with a multi-start thread, which can provide multiple thread connection points.

DETAILED DESCRIPTION

In some aspects, plasma torch heads include multiple alignment features that can be configured to provide multi-stage alignment of the torch head to a complementary torch receptacle of a torch lead during assembly. Additionally, the alignment features can be implemented for coarse and fine alignment of the torch head in both radial directions and rotational directions. Using such multi-stage alignment can help to make the connection faster and easier to make.

Figure 1:
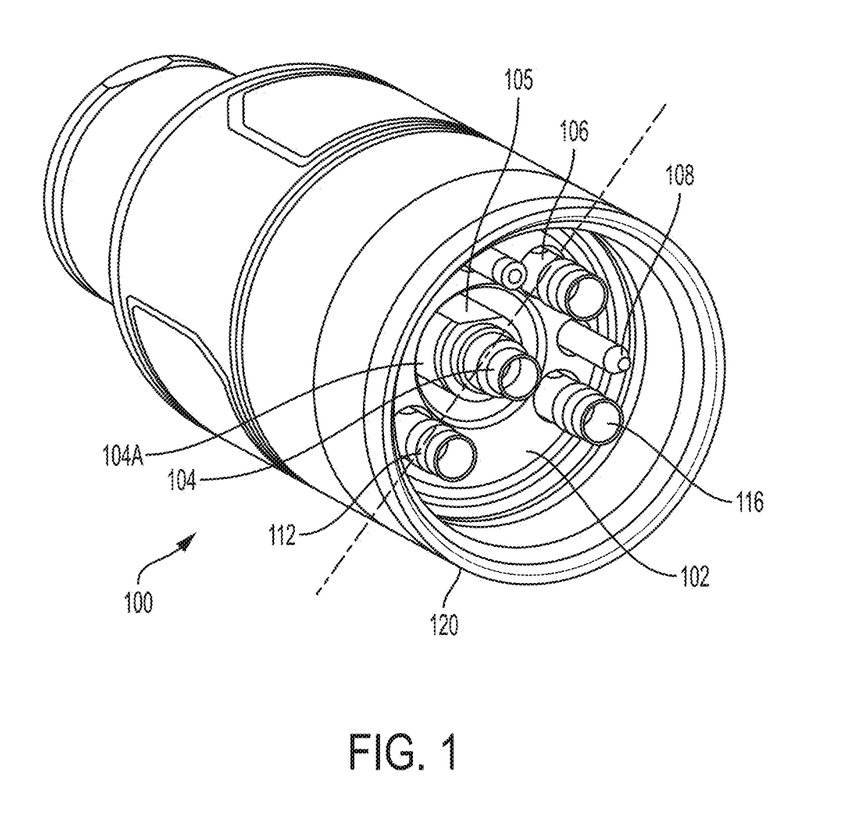
FIG. 1 is a perspective view of an example torch head for connecting a plasma arc torch to a receptacle of a torch lead, where the torch head has multi-stage alignment features.
Figure 2:
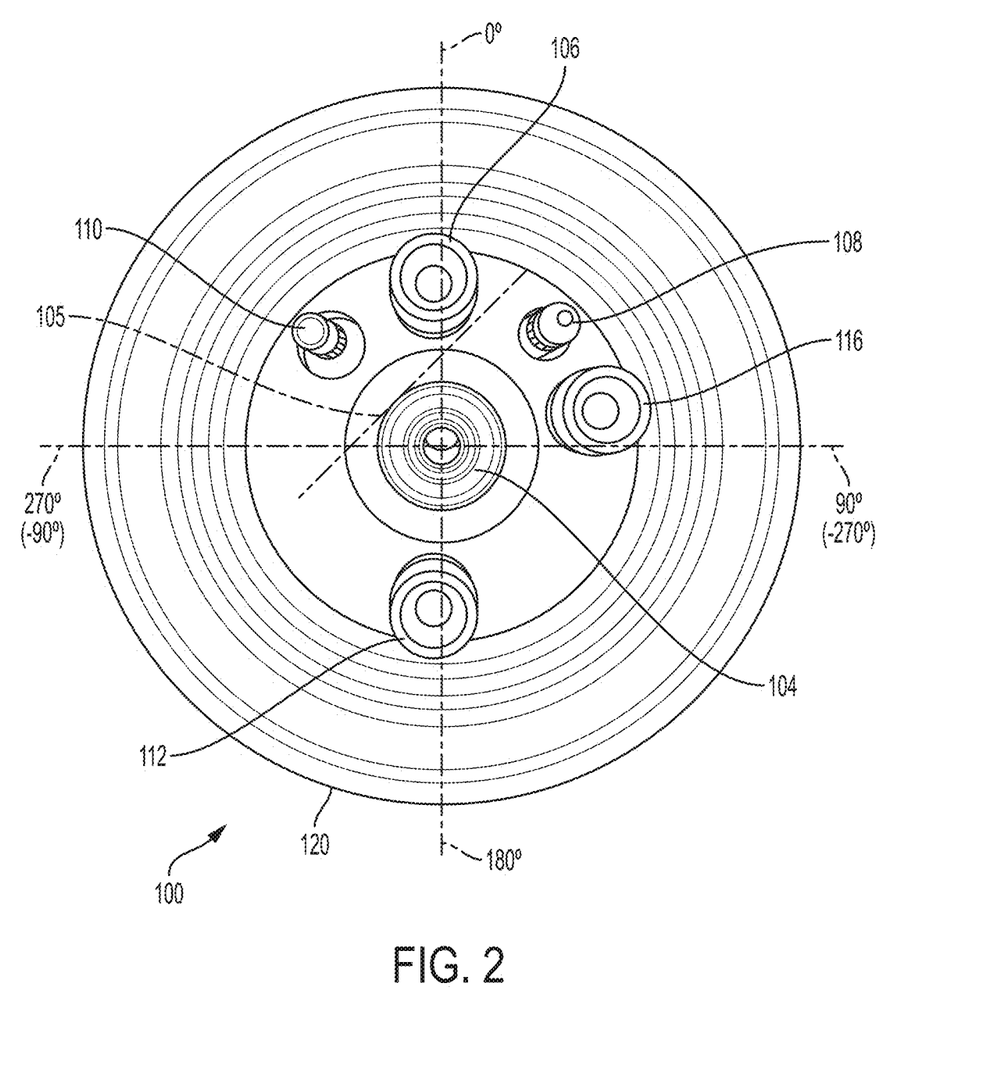
FIG. 2 is a front view of an example torch head, depicting an arrangement of multiple ports for conveying gases and electrical signals from a torch lead to the torch, as well as for aligning the torch to a torch lead during installation.

Referring to FIGS. 1 and 2, a torch head 100 to connect a plasma torch to a plasma torch lead (via a torch receptacle) can include a base portion (e.g., a structural body) 102 configured to be coupled to the torch receptacle of the plasma torch lead. The base portion 102 includes or defines a set of ports to convey one or more fluids, gases, or electrical currents or signals from the power supply system to the torch. The set of ports can include one or more fluid passageways (e.g., defined by tubing members) or standoffs or posts to facilitate an electrical connection. For example, the set of ports can include one or more coolant ports, such as a coolant supply port 104 and a coolant return port 106, one or more electrical connections, such as an ohmic contact connector 108 and a pilot arc contact connector 110, and one or more gas ports, such as a plasma gas port 112, and a shield gas port 116. In some embodiments, as discussed below, one or more of the ports can be configured to provide a combination of services to the torch to support plasma arc generation, such as transferring a combination of coolant and electrical current. In some embodiments, the base portion 102 defines a front face 103 from which the set of ports extend.

The coolant supply port 104 is typically centrally located within the base portion 102 and configured to convey a liquid coolant from the liquid-cooled plasma cutting system (via the torch lead) to a plasma arc torch connected to the torch head. As discussed in detail below, the substantially central location of the coolant supply port 104 can be helpful to center the torch head 100 within the torch receptacle during installation and connection. The coolant supply port 104 can also be configured to convey (e.g., deliver, conduct) an operational current, such as a plasma cutting current, from the liquid-cooled plasma cutting system to the plasma arc torch. For example, in some cases, the side wall of the coolant supply port 104 can be conductive to conduct the electrical current.

The coolant return port 106 can define a passage to convey return liquid coolant from the plasma arc torch to the plasma torch lead. For example, the coolant return port 106 can define a substantially cylindrical side wall that encloses a fluid passage.

The torch head 100 can include at least one plasma processing gas supply port to convey processing gases from the liquid-cooled plasma cutting system to the plasma arc torch, such as a plasma gas port 112 and a shield gas port 116. In some embodiments, the gas supply ports can include one or more bullet plugs for connecting different gases/gas supplies to the torch.

The coolant or gas connections can include one or more seals within the torch head or the receptacle. For example, in some embodiments, the coolant supply port 104, the gas supply ports 112, 116, and the coolant return port 106 include o-ring sealing members. In some cases, threads of the connector 120 (discussed below) are configured to engage with the torch lead receptacle before the o-ring sealing members engage with their complementary ports. As discussed herein configurations and locations of the various ports can be designed to reduce interference, increase flow rates, help align components, increase creepage and clearance distances, thermally and/or electrically isolate channels, and achieve various other objectives. In some embodiments, once installed, o-ring sealing members can be substantially static connections, unlike some conventional systems.

Electrical contacts, such as the ohmic contact connector 108 and the pilot arc contact connector 110 are arranged and configured to convey current to and from the torch. In some embodiments, the ohmic contact connector 108 is integrated into the torch lead line and connects with the power supply through the torch head-to-torch receptacle connection.

In some aspects, the set of ports can be shaped to align/guide alignment of the torch head and the plasma torch receptacle during connection. As discussed below, the torch head can be configured to have multi-stage alignment having a coarse (e.g., first) and fine (e.g., second) radial alignment (e.g., to align the central axes of the torch head and torch receptacle) and a coarse and fine rotational (e.g., circumferential, or clocking) alignment. In some examples, a primary alignment can be a course radial alignment, a secondary alignment can be a course rotational alignment, and a tertiary alignment can be a fine rotational alignment. For example, in some embodiments, the central coolant supply port 104 extends a first length from the base portion to serve as a primary alignment to align the plasma torch head with the torch receptacle. In some cases, the primary alignment comprises a coarse radial alignment to center the torch head 100 with respect to the plasma torch receptacle 200. For example, the central coolant supply port 104 can be inserted into a complementary port of the receptacle 200. However, due to looser tolerances, there may still be some radial play such that the two components can be adjusted relative to one another.

The central coolant supply port 104 can also include or define an additional alignment feature (e.g., a flat surface) 105 shaped to secondarily align (primarily in a rotational/circumferential manner) the torch head with the torch receptacle upon mating engagement. The secondary alignment can include a coarse rotational alignment. The flat surface 105 is defined or disposed along an outer surface of a cylindrical portion of the coolant supply port 104. The flat surface 105 can be arranged substantially parallel to a longitudinal axis of the coolant supply port 104. Additionally, the flat surface 105 can be arranged to face (e.g., be normal to) about 40 degrees to about 50 degrees (e.g., about 45 degrees) away from a coolant return port 106 relative to a central axis of the base portion. While the flat surface 105 has been generally described as being arranged at about 45 degrees, any of various other configurations are possible. That is, the angular orientation can vary and be any of various other angles when matched by a complementary feature of the receptacle.

The central coolant supply port 104 can additionally include or define an outer surface at or near a proximal region 104A of the central coolant supply port that is configured to finely radially align the plasma torch head with the torch receptacle as the torch head advances into the torch receptacle. As discussed above, a tip or radial end of the central coolant supply port 104 can be used to coarsely align the torch head with the receptacle, for example, upon initial installation and as the torch head becomes fully installed in the torch receptacle, as detailed below, the proximal region of the central coolant supply port can finely align (e.g., centralize) the torch head within the torch receptacle.

Another port, such as the ohmic contact connector 108 can include, or otherwise serve as, a tertiary alignment feature. The tertiary alignment can include a fine rotational alignment. For example, the ohmic contact connector 108 can engage first but after the coarse engagements of other components, such as the coolant supply port 104. That is, the engagement and alignment can occur in sequence to that the ohmic contact connector 108 engages before all of the other bullet connectors and is the first of all the fine connectors to engage. In some cases, the ohmic contact connector 108 can be used as the tertiary alignment because it is typically rugged, typically not subject to much relative movement during use, and can handle stresses. Alternatively or additionally, another connector pin, or a simple alignment pin, could be used as a tertiary alignment feature.

The ohmic contact connector 108 can extend from the base portion 102 to a second length that is greater than the first length. In some cases, the length of the ohmic contact connector is greater than lengths of other ports extending from the base portion 102. Having a greater length can help the ohmic contact connector 108, which can be used for alignment, engage the torch receptacle before any other outer ports (e.g., after the central coolant supply port 104). For example, the length of the ohmic contact connector 108 can be at least about 0.0625 inches to about 0.5 inches (e.g., about 0.125 inches) greater than lengths of the other ports.

In some embodiments, the torch head 100 connection points, such as the coolant ports 104, 106, electrical connections 108, 110, and gas ports 112, 116 are arranged at various off-center (e.g., asymmetrical) locations about the torch head-to-torch receptacle interface. For example, the coolant return port 106 can be disposed at about −5 degrees to about 5 degrees (e.g., 0 degrees). That is, with respect to example angular orientations, the coolant return port 106 can serve as a reference point from which the orientations of other ports can be measured or defined. The ohmic contact connector 108 can be disposed at about 40 degrees to about 50 degrees (e.g., 45 degrees). The shield gas port can be disposed at about 75 degrees to about 85 degrees (e.g., 80 degrees). The processing gas supply port 112 can be disposed at about 175 degrees to about 185 degrees (e.g., 180 degrees). The pilot arc connector 110 can be disposed at about 310 degrees to about 320 degrees (e.g., 315 degrees). Additionally, unless otherwise stated herein, given angular dimensions or definitions can include tolerances of up to about +/−5 degrees. Further, angular dimensions can include an angular position at which a port is substantially centered, or an angular position at which any portion of the port is disposed.

By way of an example only, a torch head can be configured and arranged such that the coolant return port 106 is disposed at 0 degrees relative to a central axis of the base portion (e.g., the central axis can be defined or arranged along the coolant return port and the coolant supply port); the ohmic contact connector can be disposed at about 45 degrees relative to the central axis of the base portion; the shield gas port 116 can be disposed at about 80 degrees relative to the central axis of the base portion; the first processing gas supply port 112 can be disposed at about 180 degrees relative to the central axis of the base portion; and the pilot arc connector 110 is disposed at about 315 degrees.

In some embodiments, the pilot arc contact 110 and the first plasma gas port 112 are each located adjacent to the coolant return port 106. In some embodiments, a second gas supply port (e.g., the shield gas supply port 116) can be disposed between the first plasma gas port 112 and the coolant return port 106. In some cases, the pilot arc contact 110 and the ohmic contact 108 are disposed on opposite sides of the coolant return port 106. The ports can be arranged in this manner to achieve various design goals. In some cases, arranging ports in an alternating manner, such as fluid ports disposed next to (e.g., in between) electrical ports can be useful for thermal and/or electrical isolation.

The torch head 100 can also include a connector (e.g., fastener) 120 disposed about the base portion 102. The connector 120 is configured to engage (e.g., couple, affix, attach, or otherwise connect) the base portion 102 to the torch receptacle of the torch lead and to operably connect the various ports, including each of the coolant supply 104, the coolant return 106, the gas supply ports 112, 116, and the electrical connections 108, 110, to respective complementary connections of the torch receptacle of the liquid-cooled plasma cutting system upon coupling to the liquid-cooled plasma cutting system. In some embodiments, the connector 120 can include a threaded member (e.g., a threaded nut) configured to be threaded onto a threaded portion of the receptacle. In some embodiments, the connector can include or define a multi-start thread along an interior surface. The multi-start thread can be configured to matingly engage a complementary multi-start thread on an exterior surface of the torch receptacle.

In some embodiments, the connector 120 is shaped to matingly engage the torch receptacle 200 prior to operable connection of each of the ohmic contact connector, the coolant supply port, and the at least one plasma processing gas supply port. That is, in some cases, while the alignment features can align each port with the complementary ports of the torch receptacle, they may not be fully operably engaged (e.g., sealed) until the connector engages the torch receptacle.

Referring to FIGS. 3A through 3E, the systems described herein (e.g., the torch head 100 and the torch receptacle 200) can be used to carry out various methods of multi-stage alignment and coupling of a plasma arc torch head (e.g., the torch head 100) for a liquid-cooled plasma cutting system to a component of a torch lead (e.g., the torch receptacle 200) of the liquid-cooled plasma cutting system. In some examples, as discussed below, the systems described herein can be used to carry out a multi-stage process having a coarse placement and fine adjustment of the radial position of the torch head and also a coarse placement and fine adjustment of the angular/rotational position of the torch head within the torch receptacle.

Figure 3A:
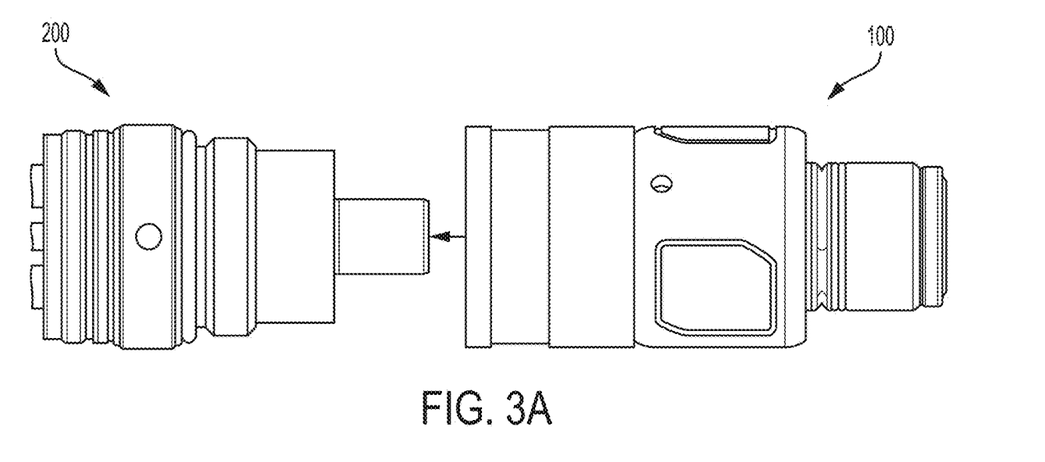
FIGS. 3A-3E are sequential cross-sectional views of an example torch head being connected to an example receptacle of a torch lead, depicting a multi-step alignment and engagement sequence.

For example, methods can first include providing a plasma torch head (e.g., torch head 100) having a base portion (e.g., the base portion 102) defining a set of ports configured to receive fluids and/or electrical signals from a plasma torch lead via a plasma torch receptacle, the set of ports being shaped to align the torch head and the plasma torch receptacle during connection.

Figure 3B:
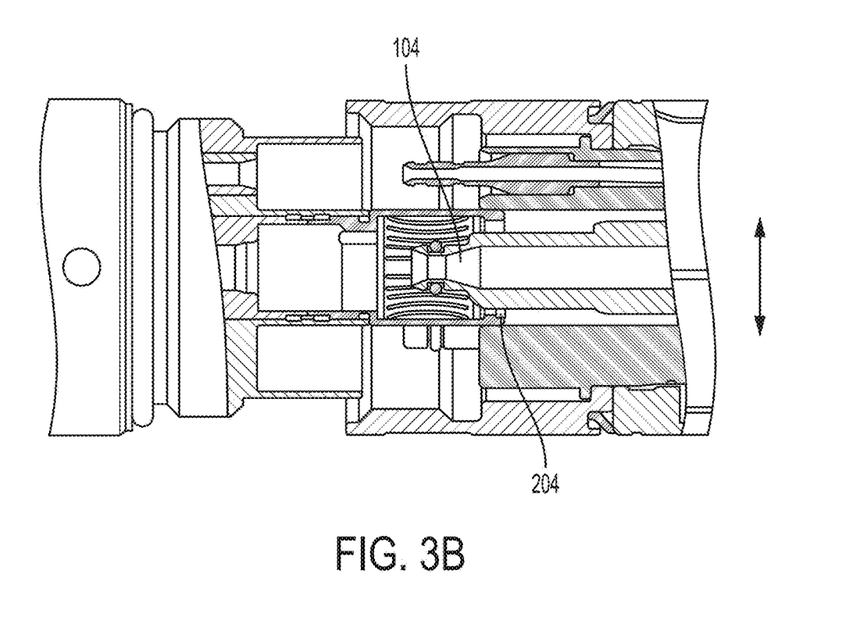

As depicted in FIGS. 3A and 3B, the methods can include inserting a central coolant supply port (e.g., the coolant supply port 104) of the set of ports into a central coolant opening 204 of the torch receptacle to coarsely radially align the plasma torch head with the torch receptacle. For example, coarse radial alignment can include a loose fit between receptacle cathode OD and torch insulator ID.

Figure 3C:
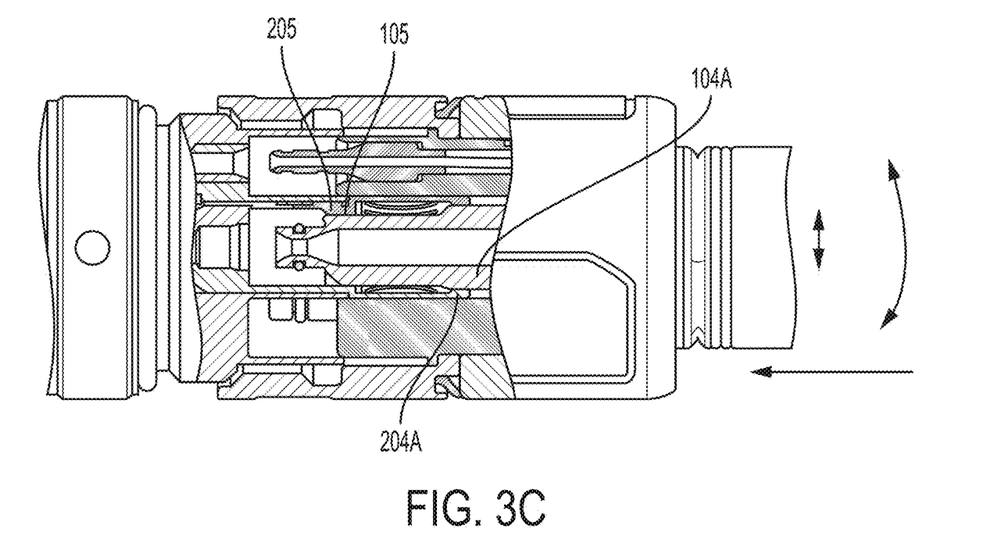

Referring to FIG. 3C, the methods can also include rotating the plasma torch head 100 relative to the torch receptacle 200 to align an alignment feature (e.g., flat surface (e.g., the flat 105)) of the central coolant supply port 104 with a complementary feature 205 of the torch receptacle to coarsely rotationally (e.g., clockingly, circumferentially) align the plasma torch head 100 with the torch receptacle 200 (features 105 and 205 limiting or preventing axial advancement of torch head 100 relative to torch receptacle 200 until they are aligned). For example, the torch head 100 can be rotated relative to the torch receptacle so that the cathode flat can be aligned with torch cathode flat. Additionally or alternatively, with the torch head coarsely rotationally aligned with the torch receptacle, the torch head can be finely radially aligned, for example, by fitting the proximal region 104A of the central coolant supply port 104 within a complementary portion 204A of the torch receptacle. To provide for a finer radial alignment, in some examples, a tolerance or fit between the proximal region 104A and the complementary portion 204A can be tighter than that of the coolant supply port 104 and the central coolant opening 204. With the torch head finely rotationally aligned with the torch receptacle, the torch head can be further inserted into the torch receptacle.

In some cases, the rotating the plasma torch head 100 relative to the torch receptacle to align the flat surface 105 of the central coolant supply port 104 with the complementary feature 205 of the torch receptacle 200 is performed after the inserting of the central coolant supply port 104 of the set of ports into the central coolant opening of the torch receptacle 200 and before the rotating the plasma torch head 100 relative to the torch receptacle to align the pin connector 108 extending from the base portion with the opening within the torch receptacle.

Figure 3D:
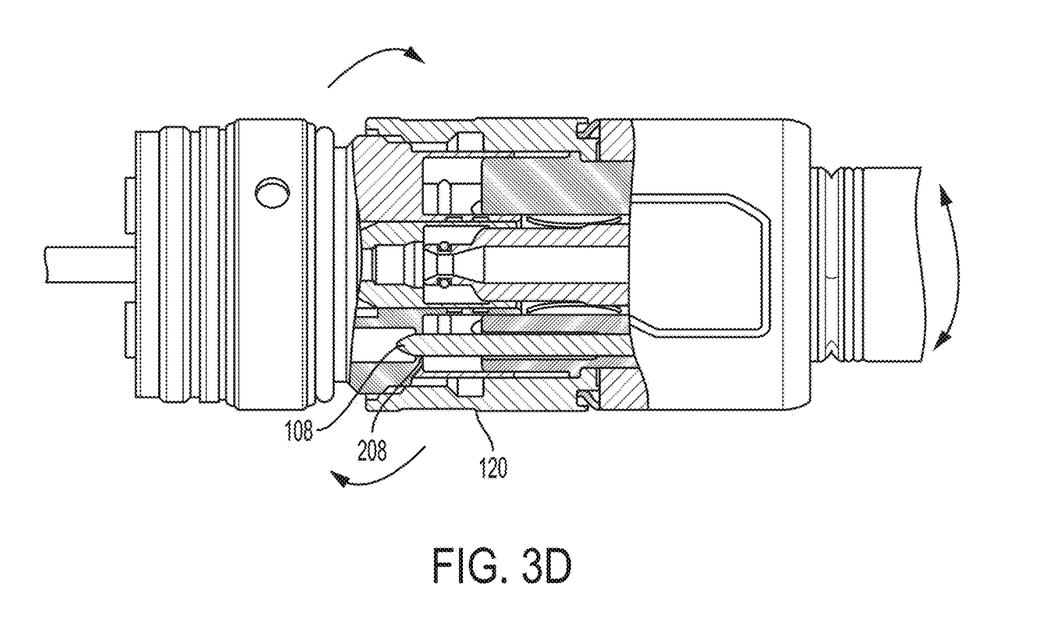

Referring to FIG. 3D, after or during inserting the plasma torch head 100 into the torch receptacle 200, the methods can include rotating the plasma torch head 100 relative to the torch receptacle 200 to align an ohmic contact connector 108 with a complementary port 208 of the torch receptacle 200 to finely circumferentially align the torch head with the torch receptacle to align other ports of the set of ports with complementary ports of the torch receptacle. In some cases, this amount of rotation may be small (e.g., a small degree of rotation). For example, the fine alignment and rotation can include a rotation of less than about 5 degrees (e.g., less than about 1 degree). That is, while the flat 105 may have initially aligned the two components, with a certain amount of slack or tolerance, the ohmic contact connector 108 can seat within the port 205 of the torch receptacle to finely rotationally align the torch head within the torch receptacle. This fine rotation can be caused by the torch itself during installation. That is, the fine rotational alignment can, in some cases, not be noticeable to the end use. At this point in the alignment, the torch can take over and drive final alignment.

Figure 3E:
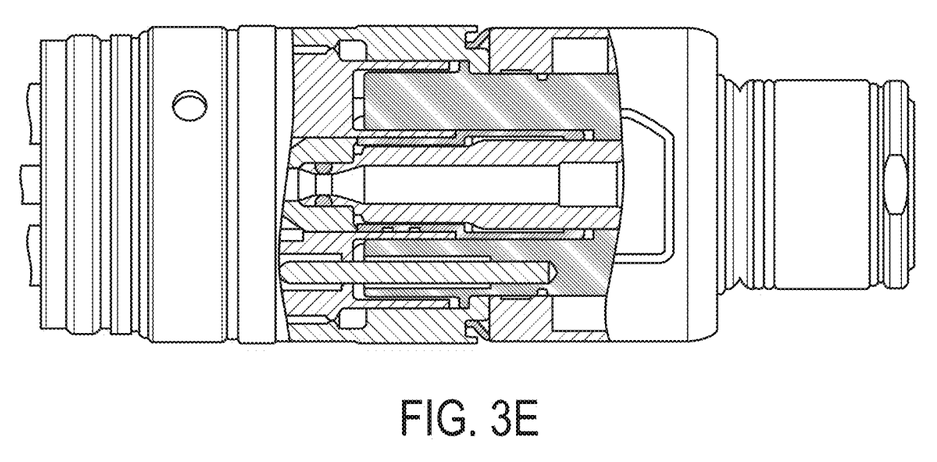

Additionally, the torch head 100 can be further inserted into the torch receptacle 200 to bring a torch connector disposed about the base portion of the torch head (e.g., the connector 120 of torch head 100) into contact with the torch receptacle. For example, with all of the ports substantially aligned, the torch head 100 can be inserted into the torch receptacle so that they can be coupled together. That is, the methods can additionally include engaging the torch connector (e.g., connector 120) to couple the torch head 100 to the torch receptacle 200 to establish connections between the set of ports of the torch head with complementary ports of the torch receptacle. In some examples, the engaging the torch connector 120 to couple the torch head to the torch receptacle can include rotating a threaded connector (e.g., a multi-start thread connector) about the base portion.

While certain alignment procedures and sequences have been described, the systems described herein can be used to align and couple the torch in other orders. For example, the coarse rotational alignment can occur before, during, or after the fine radial alignment and positioning of the torch head within the torch receptacle. That is, the torch head can be inserted into the torch receptacle and axially pushed inwardly while it is adjusted radially and angularly to make all of the required alignment adjustments. In practice, the positional adjustments for the various coarse and fine alignments may occur without the awareness of the user. That is, the user may just insert the torch head into the torch receptacle and gently shake or jiggle the respective components relative to one another and the multi-stage alignment features can align the ports as the torch head seats within the torch receptacle. But while the specific sequences may go unnoticed by the user, the considerable convenience and faster and easier connection processes can be observed and appreciated.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A plasma torch head for a liquid-cooled plasma cutting system, the plasma torch head comprising:
 a base portion;
 a set of ports disposed within the base portion and configured to receive fluids and/or electrical signals from a plasma torch lead via a plasma torch receptacle, the set of ports being shaped to align the plasma torch head and the plasma torch receptacle during connection, the set of ports including:
  a central coolant supply port defining a passage to convey a liquid coolant to the plasma torch head, the central coolant supply port extending a first length from the base portion to provide a primary coarse radial alignment of the plasma torch head with the torch receptacle, the central coolant supply port further including a flat surface shaped to provide a secondary coarse rotational alignment of the plasma torch head with the torch receptacle upon mating engagement,
  at least one plasma processing gas supply port to convey a plasma processing gas to the plasma torch head, and
  an ohmic contact connector defining a fine tertiary rotational alignment feature by extending a second length from the base portion that is greater than the first length; and
 a threaded connector disposed about the base portion configured to matingly engage the torch receptacle to couple the plasma torch head to the torch receptacle, thereby sealing the ports between the torch receptacle and the plasma torch head.

2. The plasma torch head of claim 1, wherein the coolant supply port is further configured to conduct power from the torch receptacle to the torch head.

3. The plasma torch head of claim 1, wherein, of the set of ports, a coolant return port is disposed at about 0 degrees, the ohmic contact connector is disposed at about 45 degrees, a shield gas port is disposed at about 80 degrees, a first processing gas supply port is disposed at about 180 degrees, and a pilot arc connector is disposed at about 315 degrees, respectively, relative to a central axis of the base portion.

4. The plasma torch head of claim 1 wherein, the connector includes a multi-start thread formed on an interior surface, the multi-start thread being configured to matingly engage a complementary multi-stub thread on an exterior surface of the torch receptacle.

5. The plasma torch head of claim 1, wherein the flat surface is defined along an outer surface of a cylindrical portion of the coolant supply port and is substantially parallel to a longitudinal axis of the coolant supply port.

6. The plasma torch head of claim 5, wherein the flat surface faces about 45 degrees away from a coolant return port relative to a central axis of the base portion.

7. The plasma torch head of claim 1, wherein the ohmic contact connector extends from the base portion to a second length that is greater than the first length, the second length of the ohmic contact connector is greater than lengths of other ports.

8. The plasma torch head of claim 7, wherein the second length of the ohmic contact connector is at least about 0.125 inches greater than lengths of the other ports.

9. The plasma torch head of claim 1, wherein the connector is shaped to matingly engage the torch receptacle prior to operable connection of each of the ohmic contact connector, the coolant supply port, and the at least one plasma processing gas supply port.

10. The plasma torch head of claim 1, wherein the primary alignment comprises a coarse radial alignment.

11. The plasma torch head of claim 1, wherein the secondary alignment comprises a coarse clocking alignment.

12. The plasma torch head of claim 1, wherein the tertiary alignment comprises a fine clocking alignment.

13. The plasma torch head of claim 1, wherein the central coolant supply port further defines an outer surface at a proximal region of the central coolant supply port that is configured to finely radially align the plasma torch head with the torch receptacle.

14. The plasma torch head of claim 1, further comprising a second gas supply port disposed between the first gas supply port and the coolant return port.

15. The plasma torch head of claim 14, wherein the second gas supply port comprises a shield gas supply port.

16. The plasma torch head of claim 1, further comprising a coolant return port to convey a return flow of liquid coolant from the plasma arc torch to the liquid-cooled plasma cutting system connected.

17. The plasma torch head of claim 1, further comprising a pilot arc contact, wherein the pilot arc contact and the ohmic contact are located adjacent to a coolant return port.

18. A method of aligning and coupling a plasma torch head for a liquid-cooled plasma cutting system to a torch receptacle of a plasma torch lead, the method comprising:
  providing a plasma torch head comprising a base portion defining a set of ports configured to receive fluids and/or electrical signals from a plasma torch lead via a plasma torch receptacle, the set of ports being shaped to align the torch head and the plasma torch receptacle during connection;
  inserting a central coolant supply port of the set of ports into a central coolant opening of the torch receptacle, the central coolant supply port defining a passage to convey: i) a liquid coolant to the plasma torch head, and ii) electrical power for plasma generation to the torch head, the central coolant supply port extending a first length from the base portion to coarsely radially align the plasma torch head with the torch receptacle;
  rotating the plasma torch head relative to the torch receptacle to align a flat surface of the central coolant supply port with a complementary feature of the torch receptacle to coarsely rotationally align the plasma torch head with the torch receptacle;
  further inserting the plasma torch head into the torch receptacle;
  finely rotating the plasma torch head relative to the torch receptacle to align an ohmic contact connector, of the set of ports, extending from the base portion with an opening within the torch receptacle to finely rotationally align the torch head with the torch receptacle to align other ports of the set of ports with complementary ports of the torch receptacle;
  further inserting the torch head into the torch receptacle to bring a threaded torch connector, disposed about the base portion of the torch head, into contact with the torch receptacle; and
  engaging the threaded torch connector to couple the torch head to the torch receptacle to establish sealed connections between the set of ports of the torch head with complementary ports of the torch receptacle.

19. The method of claim 18, wherein the rotating the plasma torch head relative to the torch receptacle to align the flat surface of the central coolant supply port with the complementary feature of the torch receptacle is performed after the inserting of the central coolant supply port of the set of ports into the central coolant opening of the torch receptacle and before the rotating the plasma torch head relative to the torch receptacle to align the pin connector extending from the base portion with the opening within the torch receptacle.

20. The method of claim 18, wherein the engaging the threaded torch connector to couple the torch head to the torch receptacle comprises rotating a multi-start threaded connector about the base portion.

21. A plasma torch head for a liquid-cooled plasma cutting system, the plasma torch head comprising:
  a base portion;
  a set of ports disposed within the base portion and configured to receive fluids and/or electrical signals from a plasma torch lead via a plasma torch receptacle, the set of ports being shaped to align the torch head and the plasma torch receptacle during connection, the set of ports including:
    a central coolant supply port defining a passage to convey a liquid coolant to the plasma torch head, the central coolant supply port extending a first length from the base portion to primarily align the plasma torch head with the torch receptacle, the central coolant supply port further comprising a flat surface shaped to secondarily align the torch head with the torch receptacle upon mating engagement;
    a coolant return port is disposed at 0 degrees relative to a central axis of the base portion;
    an ohmic contact connector extending from the base portion to a second length that is greater than the first length, the ohmic contact connector defining a tertiary alignment feature, the ohmic contact connector being disposed at about 45 degrees relative to the central axis of the base portion;
    a shield gas port is disposed at about 80 degrees relative to the central axis of the base portion;
    a first processing gas supply port to convey a plasma processing gas to the plasma torch head, the first processing gas supply port being disposed at about 180 degrees relative to the central axis of the base portion; and
    a pilot arc connector is disposed at about 315 degrees relative to the central axis of the base portion; and
  a multi-start threaded connector disposed about the base portion and being configured to couple the torch head to the torch receptacle.

* * * * *